(12) United States Patent
Zeck

(10) Patent No.: US 7,682,091 B2
(45) Date of Patent: Mar. 23, 2010

(54) LENS PROTECTION DEVICE

(76) Inventor: Donald A. Zeck, 8405 NW. Ogden, Portland, OR (US) 97231

( * ) Notice: Subject to any disclaimer, the term of this patent is extended or adjusted under 35 U.S.C. 154(b) by 321 days.

(21) Appl. No.: 11/843,133

(22) Filed: Aug. 22, 2007

(65) Prior Publication Data
US 2009/0052034 A1      Feb. 26, 2009

(51) Int. Cl.
*G03B 17/00* (2006.01)
*G03B 11/04* (2006.01)
*G02B 23/16* (2006.01)
(52) U.S. Cl. ............................. 396/448; 359/511
(58) Field of Classification Search ........... 396/448, 396/544; 359/511
See application file for complete search history.

(56) References Cited

U.S. PATENT DOCUMENTS 4,600,278 A    7/1986    Saito
5,495,290 A  * 2/1996   Choi .................. 348/333.08
6,033,130 A    3/2000    Muroi et al.
6,247,855 B1   6/2001    Motohashi et al.
6,672,777 B2   1/2004    Kobayashi et al.
6,799,854 B1  10/2004    Steiner

FOREIGN PATENT DOCUMENTS

JP         2006301227 A  * 11/2006

* cited by examiner

*Primary Examiner*—Rochelle-Ann J Blackman
(74) *Attorney, Agent, or Firm*—Peter A. Haas

(57) ABSTRACT

A lens cover device for a camera lens, particularly suited for use with a telephoto lens and hood assembly, comprises a disk-like body member having a plurality of retention members. The retention members provide friction within the filter-thread region of the camera lens. A large handle attached to one face of the cover device enables a photographer to easily cover or uncover the lens whether the lens and hood are in the shooting position or the stored position.

9 Claims, 5 Drawing Sheets

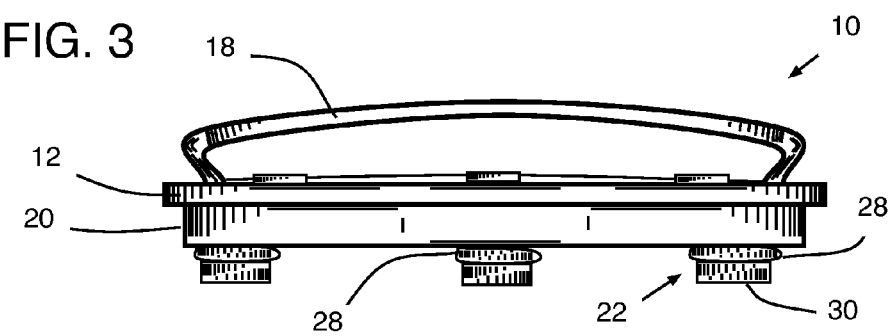
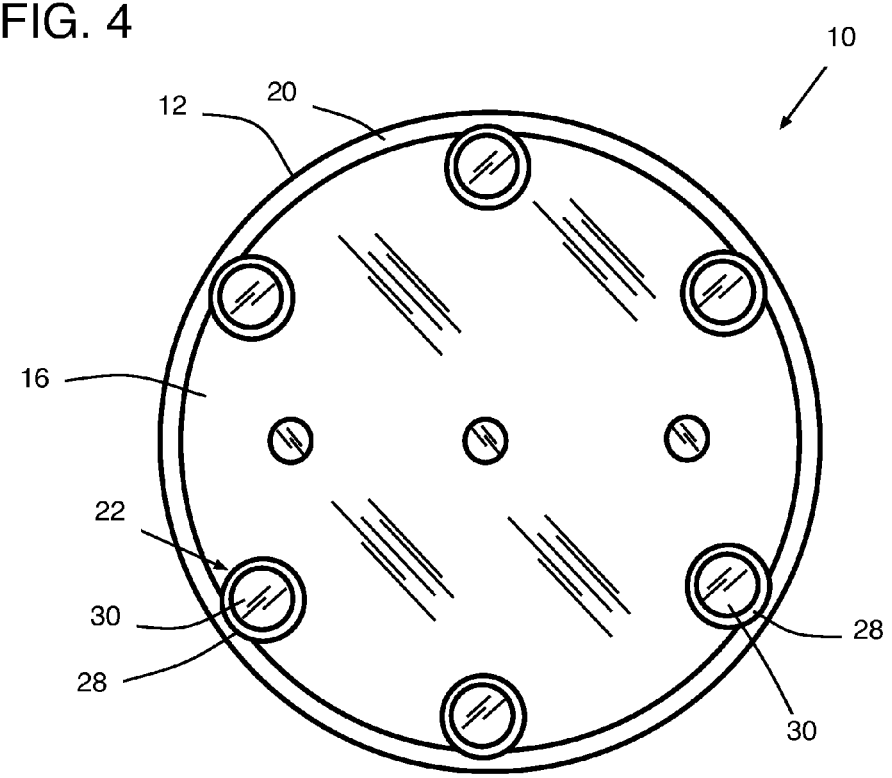

LENS PROTECTION DEVICE

BACKGROUND

The present invention relates to a lens protection device, and more particularly to a removable cover device for a camera lens.

A camera lens protection device, or lens cover, or lens cap, protects a front surface of a photographic lens. The lens cover removes from the barrel during photographic use and attaches when not in use to protect the fragile outer-lens surface from damage. Various attempts to provide a lens cover or other such protection or barrier device suitable for protecting a camera lens include articulating lens caps that remain coupled to the lens barrel or camera body and rotate away from the front surface of the barrel lens or removable caps incorporating tensioning devices and release mechanisms.

One such articulating lens protection device includes U.S. Pat. No. 6,799,854 to Steiner on 5 Oct. 2004. The Steiner reference discloses a protective lens cap for binoculars. The lens cap includes a single articulating mechanism consisting of a pivot joint. This enables the lens to articulate from a substantially horizontal pivot axis to a substantially vertical pivot axis. Accordingly, the protective lens cap can be swung upwards from the closed condition about the substantially horizontal pivot axis and secured to the body. The Steiner lens cap includes an attachment that enclasps an outer edge of the lens cap by a crimp having pivot-bearing bolt molded integrally to form part of a pivot bearing. A joining piece includes a forked end to cooperate with the pivot bearing bolt to establish a bearing axis corresponding to a central longitudinal axis of the bearing bolt.

Another representative example of prior-art articulating lens covers adapted for use on cameras includes the disclosure of Motohashi et al. in U.S. Pat. No. 6,247,855 on 19 Jun. 2001. The Motohashi reference describes moving mechanism attached to a camera. The mechanism transfers linear motion along the optical axis to rotary motion adapted to rotate a lens cover about 180-degrees from a first position covering the front surface of the lens to a second position. The mechanism includes a cover open/close groove formed along the optical axis of the lens on both sides of a pedestal extending downward from the outer circumference of the lens barrel. Protrusions of a cover manipulation member engage the cover open/close groove so that the protrusions can slide freely along the optical axis of the lens. A cover manipulation member supports a lens protecting cover for opening or closing the face of the photographic lens and drives the lens protecting cover into the open or closed positions. Additionally, a spring assembly serves as a constraining member to force the cover into a closed position when the cover manipulation member presents the lens to the front of the barrel. A similar articulating structure is disclosed by Muroi et al. in U.S. Pat. No. 6,033,130 on 7 Mar. 2000.

Another example of an articulating lens cover includes the lens barrier device described in U.S. Pat. No. 6,672,777 to Kobayashi et al. on 6 Jan. 2004. The Kobayashi device includes a lens barrier movable between a position covering a front of a lens and a position withdrawn from the front of the lens. An engagement member engages a filter screw-thread provided by the barrel lens and a rotary shaft that enables the barrier to rotate about 180-degrees from the position covering the front of the lens the withdrawn position. A spring assembly provides sufficient pressure on the barrier device to selectively restrain the barrier in the covering position until a sufficient manual force is applied to deliberately rotate the barrier to the withdrawn position.

Although articulating lens devices of the prior art provide one advantage of permanently coupling a lens cover to the camera or lens barrel—ensuring that the lens cover can not be misplaced—such designs afford this advantage at considerable cost as measured by complexity of mechanisms, numbers of moving parts, and expense to manufacture and maintain.

The second type of lens protection devices of the prior art include removable caps that incorporate tensioning devices and release mechanisms. U.S. Pat. No. 4,600,278 to Saito issued on 15 Jul. 1986 represents a type of removable lens caps incorporating a locking member movable radially of the body of the cap. This conventional removable cap includes a disk-like body and locking member that is held to the body so as to be radially movable. A pair of support blocks mounts on the body in parallel relation to a radius. Each support block includes a retaining groove and guide surface, which guides sliding movement of engaging legs provided by the locking member. Compression springs cause the locking member to protrude into a screw thread provided by the barrel of the lens. To remove or insert the lens cap, a user must apply a force inward to the center of the disklike body. The locking member includes a feature that enables a user to insert a portion of the user's finger for this purpose.

Although the type of lens cover described by Saito protects the front end of a lens barrel, this design includes several parts, which must be carefully assembled. This design relies on springs to exert a force—and importantly—requires the barrel to provide a filter thread, which may not always be available Further, this design includes moving parts and a number of components, of which the movement of parts is necessary to successfully insert and remove the lens cap from the barrel. The number of parts along with tolerances between parts and wear induced on the parts results in a design that is both uneconomical to produce and prone to failure. Of particular concern, the tensioning spring members of this prior-art design are prone to premature failure, which renders the cap unable to remain in place and no longer functioning as a lens protection device.

Many of the prior-art attempts to provide a cover device for a camera lens do not work with larger lenses, such as large telephoto lenses equipped with a hood. A lens hood prevents unwanted light rays from entering the lens, reducing glare and ghost images. A lens hood, which is generally cylindrical or conical in shape, includes an internal screw-thread adapted to couple over the end of a barrel lens assembly, such as a telescopic lens for a camera. Once in place, the lens hood prevents known prior-art lens caps from mounting on the lens. One other limitation of a bag-type lens protection device for larger barrel lenses, which use a cloth or leather sack open on one end with a drawstring closure at the open end, includes imperfect sealing of the bag when the lens barrel is transported and, further, the bag cannot be used once the lens mounts to the camera.

Another problem common with the prior art lens caps include a practical difficulty of removing and inserting the lens cap when the hood is attached and the lens is in a shooting position, The deep void between the face of the hood and the face of the lens makes it impossible for many photographers to reach in and exert sufficient pressure on the typical radial mounted, spring-tensioning devices of the prior art. Further, articulating lens covers do not work at all with a hood. The articulating structure blocks and makes physically impossible to mount a hood to such a lens assembly.

Thus, there remains a need for a lens cap device that can be economically produced and that limits the number of components. Such a device, ideally, would not have moving parts, which are prone to wear and failure. Such a device should remain fast in position when protecting the lens, but be readily and easily removable when the lens is needed for use with a camera.

SUMMARY OF THE INVENTION

The present invention improves the state of the art by providing a mechanically simple design that includes no moving parts. A clever arrangement of components that utilize frictional forces results in removable lens cap that is simple and economical to produce, easy to use, and provides superior protection of the front end of a lens barrel for a camera.

Other advantages of the present invention include: An oversized handle to facilitate mounting or removing the lens cap on the barrel; The handle compresses for storage; The ability to mount the cap when the lens hood is in the shooting or stored position; Non-marring, non-damaging contact parts with the hood prevents damage to the lens hood and barrel assembly; The cap works with factory-supplied hoods; and A rugged and durable design and fabrication resists weather, damage, and ensures a long-life of use.

DRAWING

FIG. 3 is a left-side view of the embodiment of FIG. 1.

FIG. 4 is a bottom view of the embodiment of FIG. 1.

DESCRIPTION OF THE INVENTION

Figure 1:
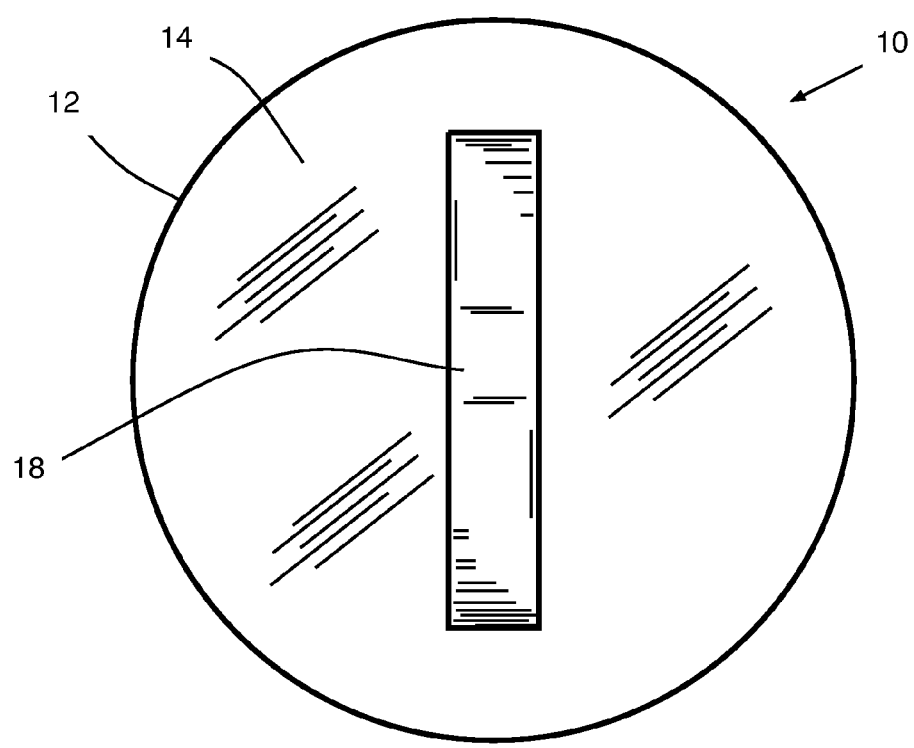
FIG. 1 is a top view of one embodiment according to the present invention.
Figure 2:
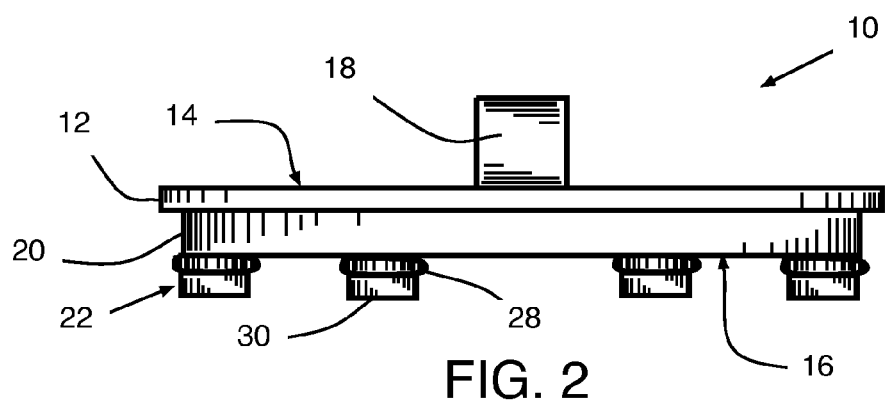
FIG. 2 is a front view of the embodiment of FIG. 1.

The present invention, described herein and illustrated in the accompanying figures of the drawing, is portrayed through the use of exemplary embodiments that represent its spirit and scope. Further, in the various figures certain components may be omitted to more clearly illustrate a particular aspect of the invention. And, those skilled in the art will appreciate that various combinations of elements, substitutions of elements, omissions, and deletions of elements will not deviate from the spirit and intent of the present invention. The scope of the invention shall be limited only by the appropriate construction of the claims that follow.

Figure 9:
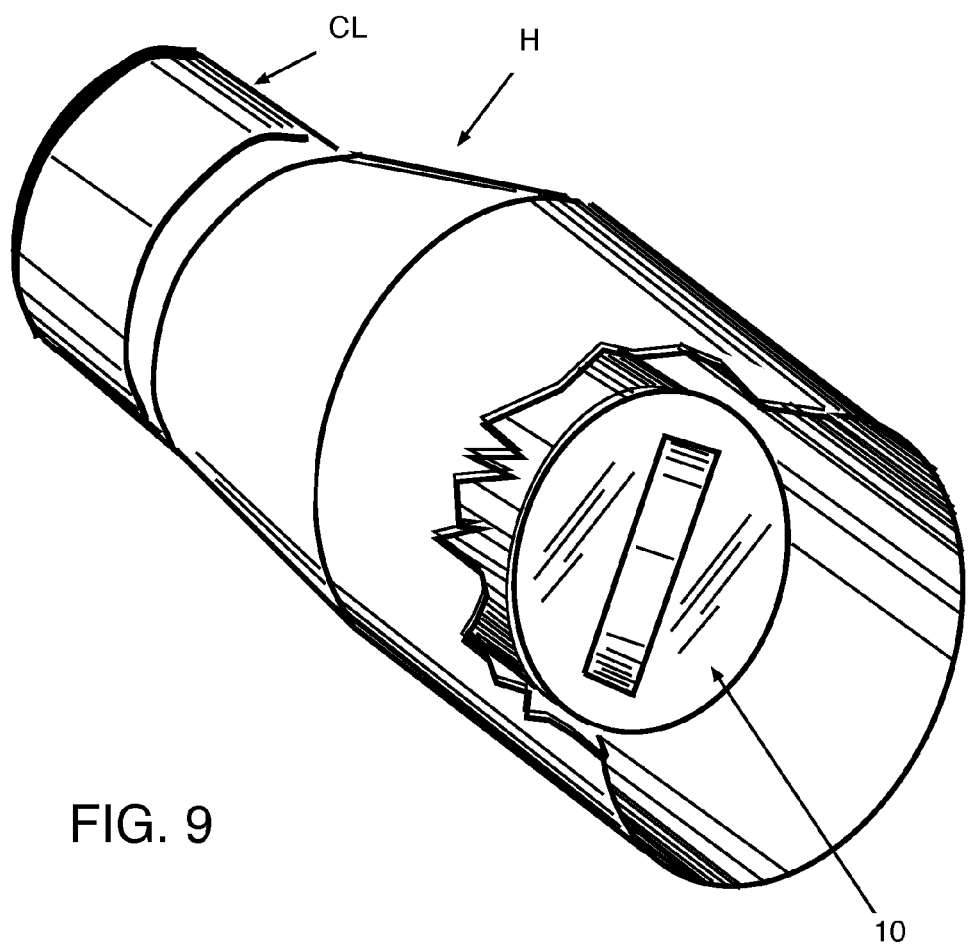
FIG. 9 is an offset side view and partial cut-away detailing the present invention as used on a camera lens having a hood.

In one embodiment of the present invention, a lens cap device suitable to protect the front face of a lens, particularly a telephoto lens for a camera, consists of a disk-like body having a large handle. FIG. 9, for example, shows the lens cap 10 of the present invention mounted on a telephoto lens CL with a hood assembly H. Advantageously, the lens cap 10 easily mounts using a friction fit to the lens whether the hood is attached (as shown in FIG. 9) or removed, and whether the lens is in the shooting position (as shown in FIG. 9) or in the stored position.

FIGS. 1-4 detail one particular embodiment of the lens cap device 10 of the present invention. An oversized handle member 18 mounts to a front face 15 of a generally disk-like body 12. The handle member is collapsible to about 3/16-inch high, allowing for easy storage when not in use and further allowing the lens and cap assembly to fit in most camera sleeves, socks, or cases that are sold with a typical telephoto lens, as well understood in the art. The disk-like body and related components are manufactured from a rugged black polyproylene. The handle member, in a preferred embodiment, comprises an ultra-high density polyethylene. Rivets, such as rivets provided by Micro Plastics, Inc. having a part number of 27QB400375B, couple the handle to the body. However, as understood in this art, many other plastic materials, metals including aluminum, and composite materials would work equally well.

As the present invention is well-matched to protecting telephoto camera lenses, the disk-like body can be made in various dimensions to specifically fit to and adapt to use with known lenses including lenses manufactured by and sold under Cannon-brand available from Cannon Inc. at www.cannon.com, for example. Examples of sizes include a 200-mm F1.8, 300-mm F2.8, 400-mm F4 DO, 400-mm F2.8, 500-mm F4, 600-mm F4 in both "IS" and "non IS" versions.

Figure 5:
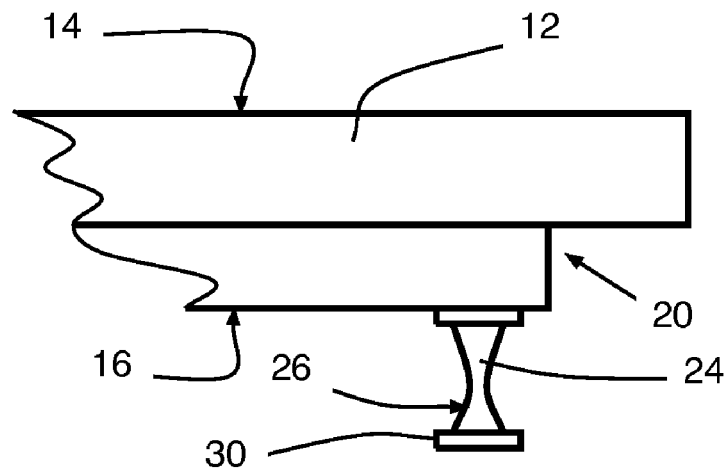
FIG. 5 is a partial right side view detailing the retention member according to the embodiment of FIG. 3.
Figure 6:
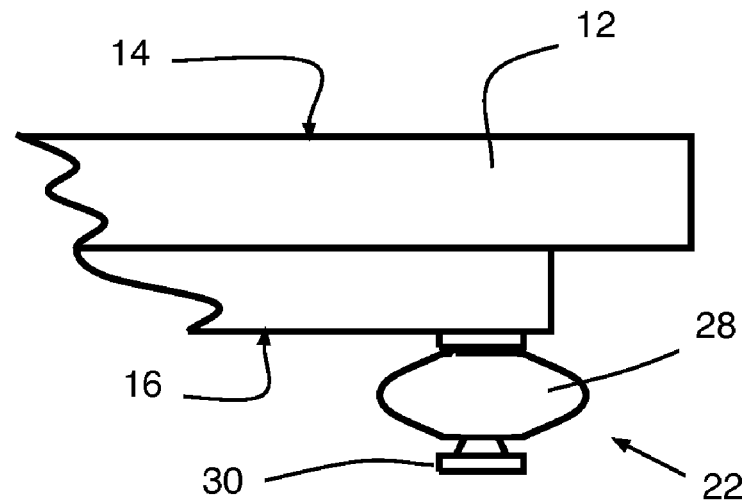
FIG. 6 is a partial right side view showing an annular ring as part of the retention member of the embodiment of FIG. 5.

Additional features of the present invention include a circumferentially arranged shoulder feature 20 adjacent to the second face 16, resulting in an overhang between the disk-like body 12 and the shoulder. Protruding generally perpendicular from the second face and spaced equa-distantly from each other, a plurality of retention members 22 consist of a strut 24 having a channel 26 adapted to receive an annular ring 28. The ring 28 is held in place by a head 30 arranged at a distal end of the strut. FIGS. 5 and 6 further elaborate the strut 24. The channel 26 is arcuately shaped to readily hold a standard O-ring. In a preferred embodiment, a suitable O-ring retention ring 28 includes an o-ring available from ACP Technologies having a part number Z-110N70, for example. A portion of the retention ring 28 extends beyond the shoulder feature 20 on the body 12, but does not extend beyond the outside edge of the disk-like body. This positioning of each retention member positions the ring 28 to cooperate with each of the remaining retention members 22 to provide a friction hold between the device 10 and an interior wall portion provided by the camera lens.

Figure 7:
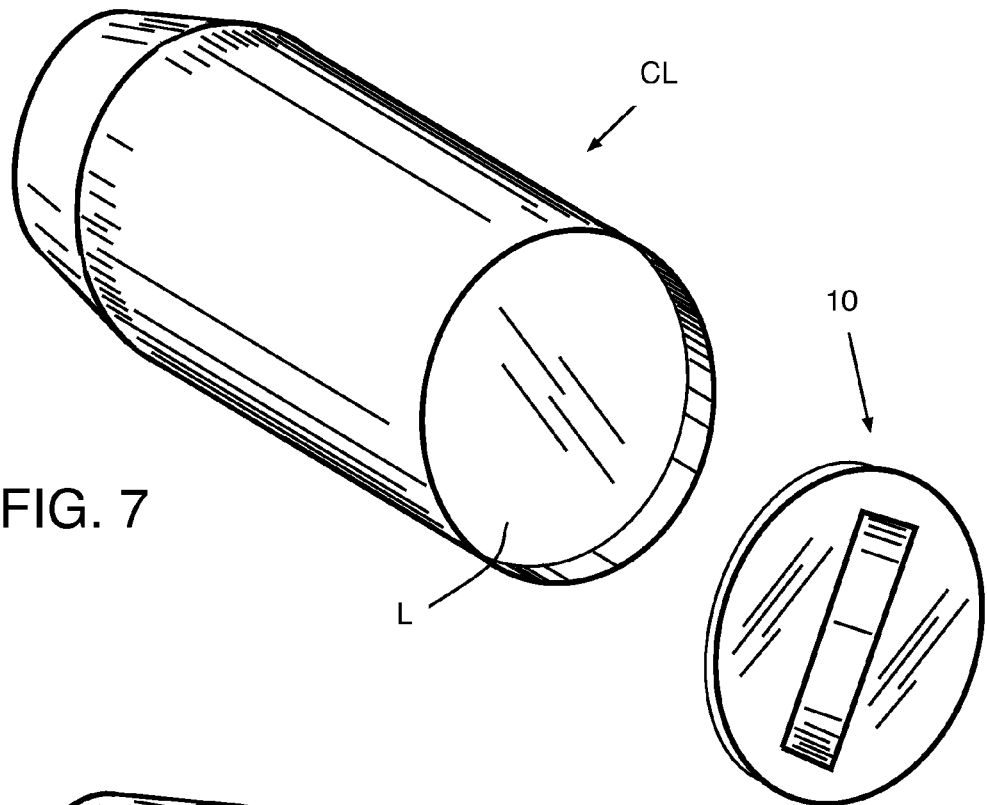
FIG. 7 is an offset side view of the embodiment of FIG. 1 as typically used in relation to a camera lens.
Figure 8:
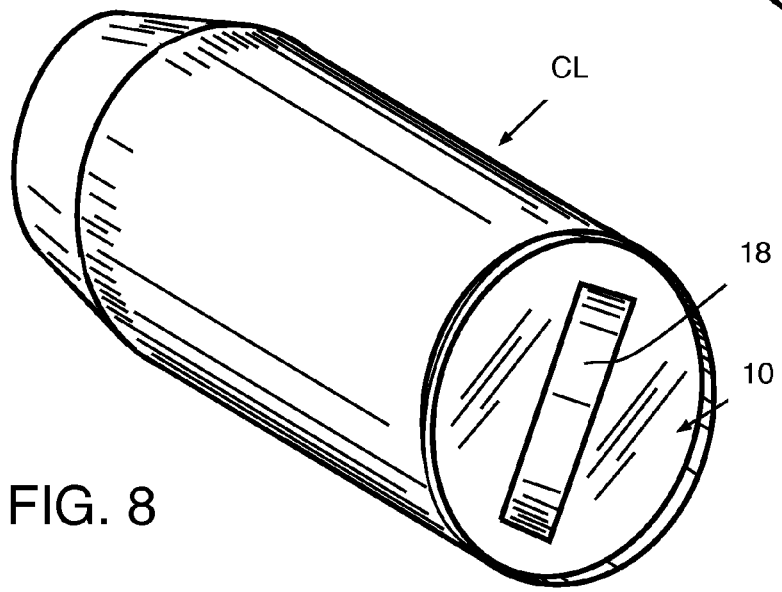
FIG. 8 is an offset side view of the embodiment of FIG. 7 mounted on a camera lens.

FIGS. 7 and 8 show the lens cap device 10 in relation to a front face of a camera lens CL. Many existing camera lenses, as well-understood in the art, include a thread screw for selectively mounting filters. The present invention, however, does not require the thread-screw, and rather, uses a friction seal between a portion of the O-ring retention ring 28 and the interior wall portion of the lens. Accordingly, the present invention works equally well absent any such filter screw-threads. The rings 28 protrude from the shoulder 20 sufficiently to cause a friction hold with the lens, but are further arranged to ensure that the friction hold can be over-powered by pulling or pushing on the handle element 18. The lens cap 10 must remain in place once positioned over the front face of the lens, but also be easy to remove when the photographer needs to remove the lens cap.

In another embodiment, the present invention consists of a lens cap device for a camera lens. The lens cap device comprises a disk-like body; a handle member disposed on a first face of the disk-like body; and a plurality of friction-enhancing retention members protruding from a second face of the disk-like body, wherein the second face is disposed opposite the first face.

At least one of the plurality of friction-enhancing retention members further comprises a generally cylindrical strut having a channel adapted to receive an annular ring member, the strut coupled to the second face at one end and terminating in a head at an opposite end, the head adapted to retain the annual ring member.

The second face of the disk-like body further comprises an annular shoulder circumferentially disposed about an outside edge of the body.

In one embodiment the plurality of retention members comprises six retention members.

In another embodiment, the present invention consists of a A lens cap device for a lens having a barrel with an interior wall portion adjacent to a front face of the lens. The device comprises a disk-like body; a handle member disposed on a first face of the disk-like body; and a shoulder arranged adjacent to a second face of the disk-like body wherein the second face is arranged opposite from the first face; at least three retention members disposed on the second face wherein at least one retention member comprises a strut protruding generally perpendicular from the second face, the strut being further adapted to receive an annular ring member, and the ring member being disposed on the strut so that a portion of the ring member overlaps a corresponding portion of the shoulder, but does not extend further than a circumference defined by an outer edge of the disk-like body whereby the cooperation of the at least three retention members enables a friction fit of the device with the interior wall portion provided by the camera lens.

Although the invention has been particularly shown and described with reference to certain embodiments, it will be understood by those skilled in the art that various changes in form and detail may be made without departing from the spirit and scope of the invention.

I claim:

1. A lens cap device for a camera lens, the device comprising:
   a disk-like body;
   a handle member disposed on a first face of the disk-like body;
   a plurality of friction-enhancing retention members protruding from a second face of the disk-like body, wherein the second face is disposed opposite the first face; and wherein any at least one of the plurality of retention members further comprises a generally cylindrical strut having a channel receiving an annular ring member, the strut coupled to the second face at one end and terminating in a head at an opposite end, the head retaining the annual ring member.

2. The device of claim 1 wherein the annular ring member comprises an O-ring.

3. The device of claim 1 wherein any at least one of the plurality of retention members further comprises an O-ring.

4. The device of claim 1 wherein the second face of the disk-like body further comprises an annular shoulder circumferentially disposed about an outside edge of the body.

5. The device of claim 1 wherein each one the plurality of retention members comprises a strut arranged generally perpendicular to the second face of the disk-like body and further receiving an associated annular ring member; and
   the ring member being disposed on the strut so that a portion of the ring member overlaps a corresponding portion of the shoulder, but does not extend further than a circumference defined by an outer edge of the disk-like body whereby the cooperation of any two retention members enables a friction fit of the device with the camera lens.

6. The device of claim 1 wherein the plurality of retention members comprises six retention members.

7. A lens cap device for a lens having a barrel with an interior wall portion adjacent to a front face of the lens, the device comprising:
   a disk-like body;
   a handle member disposed on a first face of the disk-like body; and
   a shoulder arranged adjacent to a second face of the disk-like body wherein the second face is arranged opposite from the first face;
   at least three retention members disposed on the second face wherein at least one retention member comprises a strut protruding generally perpendicular from the second face,
   the strut retaining an annular ring member, and
   the ring member being disposed on the strut so that a portion of the ring member overlaps a corresponding portion of the shoulder, but does not extend further than a circumference defined by an outer edge of the disk-like body whereby the cooperation of the at least three retention members enables a friction fit of the device with the interior wall portion provided by the camera lens.

8. The device of claim 7 wherein the ring member comprises an O-ring.

9. The device of claim 7 further comprising six retention members.

* * * * *